United States Patent
Roso

(10) Patent No.: US 6,555,152 B1
(45) Date of Patent: Apr. 29, 2003

(54) PROCESS FOR THE SUBDIVISION OF A LONG TAPE OR STRING OF GUMMY PRODUCT INTO SINGLE PORTIONS AND DEVICE FOR CARRYING OUT SAID PROCESS

(76) Inventor: Paolo Roso, Via M. Pasubio 34B, I-36036 Valli Del Pasubio (IT)

(*) Notice: Subject to any disclaimer, the term of this patent is extended or adjusted under 35 U.S.C. 154(b) by 0 days.

(21) Appl. No.: 09/744,342
(22) PCT Filed: Jul. 19, 1999
(86) PCT No.: PCT/IT99/00227
§ 371 (c)(1),
(2), (4) Date: Jan. 23, 2001
(87) PCT Pub. No.: WO00/04791
PCT Pub. Date: Feb. 3, 2000

(30) Foreign Application Priority Data
Jul. 23, 1998 (IT) .......................................... VR98A0067

(51) Int. Cl.⁷ ................................ A23G 7/00; A23P 1/00
(52) U.S. Cl. .................... 426/516; 83/932; 425/308; 425/316; 426/5; 426/518
(58) Field of Search ................ 426/512, 516, 426/518, 5; 83/932; 425/308, 316

(56) References Cited

U.S. PATENT DOCUMENTS 4,940,594 A * 7/1990 Van Alstine ........................ 426/5
6,103,288 A * 8/2000 Kobayashi et al. ............ 426/518

FOREIGN PATENT DOCUMENTS

| DE | 196 16 640 A1 | 11/1997 |
|---|---|---|
| GB | 1 354 505 | 5/1974 |
| GB | 2 122 131 A | 1/1984 |
| IT | MI97A 00027 | 1/1997 |

OTHER PUBLICATIONS

International Search Report and references cited therein.

Database WPI, Week 198418, Derwent Publications Ltd., London GB, AN 1984–112967.

* cited by examiner

Primary Examiner—George C. Yeung
(74) Attorney, Agent, or Firm—Greenberg Traurig, LLP

(57) ABSTRACT

A process is disclosed for the subdivision of a relatively elastic and gummy food product shaped as a continuous tape or string (14), which is extruded or laminated, and advancing at a predetermined speed on a conveyor (15), into a plurality of single portions (14', 14") which are separated from one another by a predetermined distance (X). The cutting operation of said tape or string (14) is carried out by at least one blade (31, 31'), which is suitable for penetrating into the mass of the tape or string (14) and for causing the detachment of a portion (14', 14") of the tape or string itself. The blade (31, 31'), follows a predetermined trajectory (50) comprising a first stretch (51) wherein said tape or string is cut, a second stretch (52) along the same advancement direction of the tape or string, a third stretch opposite to the advancement direction of the tape or string (14). Moreover the blade runs along said second stretch (52) at a higher speed than that of advancement of the tape or string (14); along said second stretch (52) the blade (31, 31') stays in contact with the edge of the portion (14', 14") of tape or string in order to separate the portion itself of tape or string by a predetermined distance (X).

10 Claims, 3 Drawing Sheets

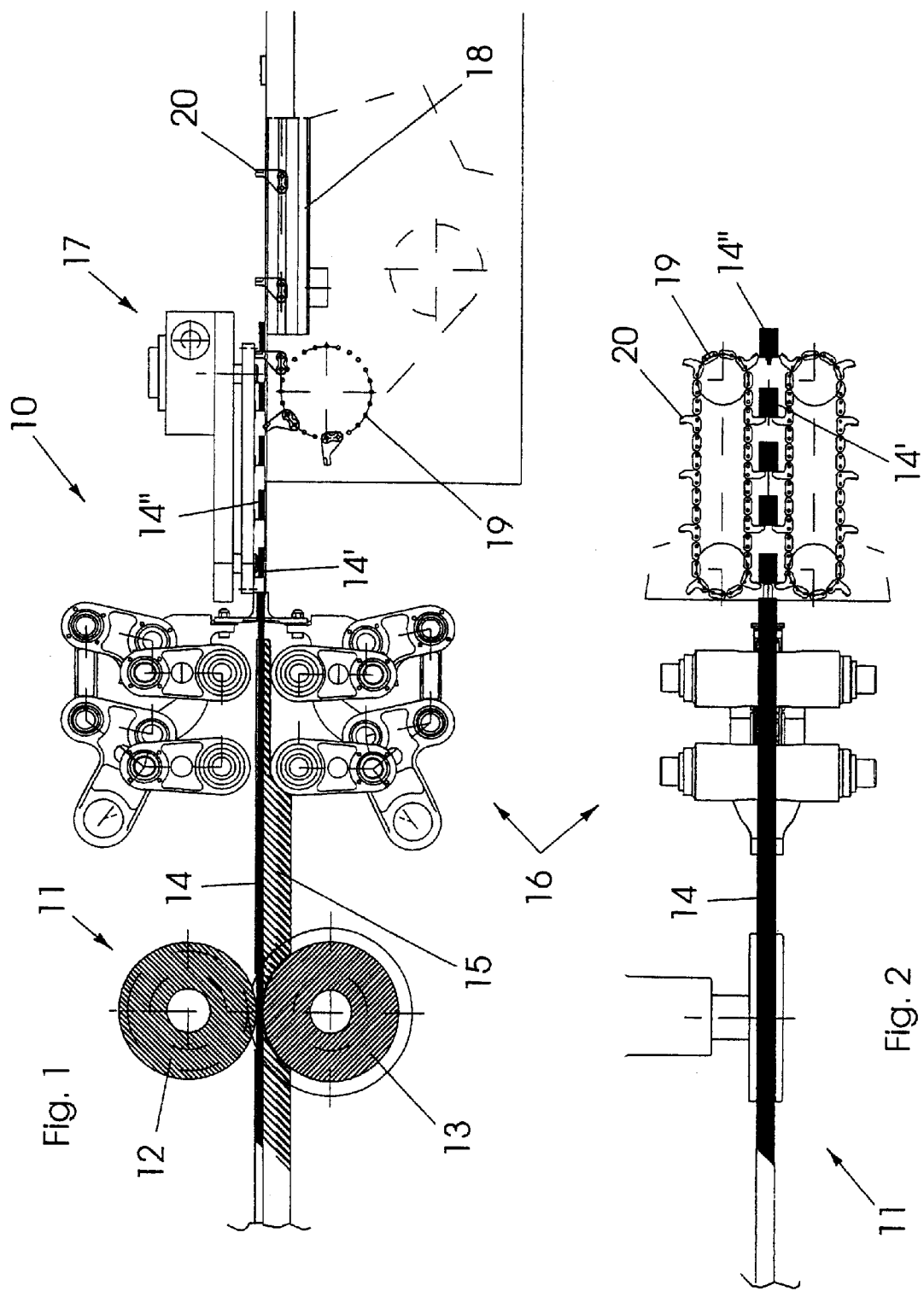

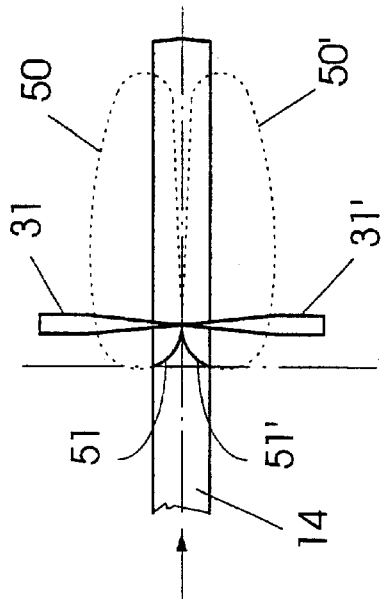
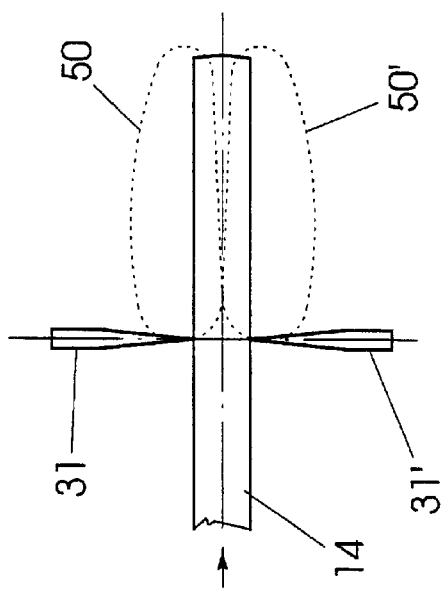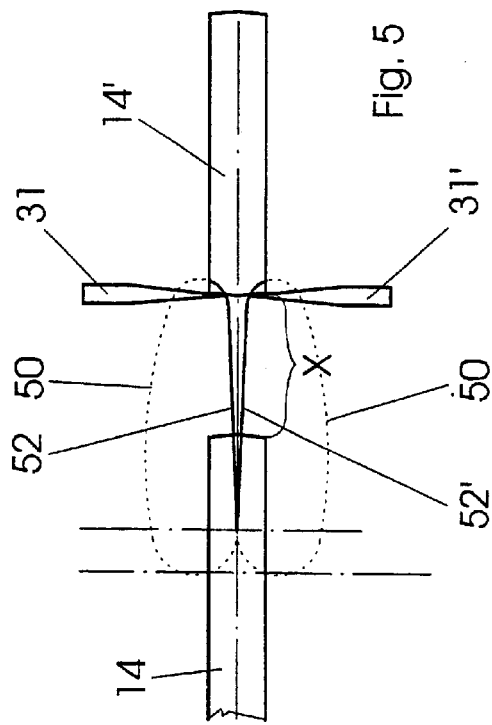

PROCESS FOR THE SUBDIVISION OF A LONG TAPE OR STRING OF GUMMY PRODUCT INTO SINGLE PORTIONS AND DEVICE FOR CARRYING OUT SAID PROCESS

FIELD OF THE INVENTION

The present invention relates to a process for the subdivision of a long tape or string made of a gummy material into single portions; in particular, the present invention relates to a process operated in an industrial plant on a continuous basis, wherein an extruded or laminated relatively elastic and gummy edible product having the shape of a long tape or string is subdivided into a plurality of single portions which are separated from one another by a predetermined distance.

The present invention further relates to a cutting device for carrying out said process.

The invention is particularly advantageously applicable to the food industry.

STATE OF THE ART

In the food industry, some products of the type that includes chewing-gum and several kinds of soft toffees, are obtained starting from long tapes and/or strings coming out of a die-plate, laminating rolls or an extruder.

Within this specific gamut of functions, there are found to be very well known machine assemblies known with the name of "cut and wrap", which schematically consist of a die-plate or of laminating rolls, that shape the gummy mass as a tape and/or string, with a cutting device adjacent thereto that is capable of subdividing said string or tape into single pieces, together with a packing machine that packages said single pieces, the tape or string lying on a suitable conveyor that advances on a continuous basis.

The process is generally operated automatically, thanks to suitable synchronisms between parameters given by product advancement and cutting and packaging frequency of the single portions.

According to a form of embodiment known in the art, a device for severing a gummy tape or string consists of rotating or multiple blades located above the string which, moving downwards, carve the material so much that they get to the complete severing to all single pieces.

Such a system has some disadvantages related to its constructive complexity and to the specificity of the product itself which, soft and sticky as it is, makes the cutting action complicated, remarkably limiting the speed of execution and the overall productivity of the whole plant.

Italian patent application N. MI97A000027 discloses a device for cutting single portions starting from a tape made of gummy material.

Said device comprises a first drum with a relatively large diameter, located above the conveyor on which the tape of product to be cut advances at a constant speed, and a second drum, with a relatively small diameter, which is located underneath said first drum, exactly in correspondence with a gap between two adjacent conveyors.

Drums are located at a predetermined distance from one another, so that during their rotation in opposite directions, the tape of product is dragged along and made to advance by the outside surfaces of the drums themselves.

The upper drum is provided with a plurality of windows which are located at predetermined distances from one another, whereas the lower drum is provided with just one window.

A blade operates inside the upper drum, and moves following an ellyptical trajectory whose longer axis is perpendicular to the plane on which the product to cut advances. The movement is made possible by a suitable dragging mechanism consisting of a couple of epicyclic trains.

Thanks to a suitable choice of the speed of rotation of the epicyclic trains—these are directly responsible for the speed of the blade moving along its ellyptical path—and of the two drums, the blade systematically ends up finding itself in a position that corresponds with the two aligned windows of the drums; by moving through these two windows the blade cuts the product that is underneath it and is held still by the two drums.

Such a severing device has remarkable drawbacks and disadvantages that limit its use.

First and foremost the system is very complicated from the constructive point of view, therefore it is very costly; it has also limits from a purely technical standpoint, as it does not make it possible to reach high cutting rates, that is in the range of 1200–1500 or more pieces produced per minute because of the remarkable mass and inertia of the several components, as well as because of the objective difficulty found in obtaining a synchronism that is perfect and continuously repeatable in time, between the movement of the blade and the rotation of the two drums that have their windows aligned with one another for the two way passage of the blade only for an extremely short time lapse.

Furthermore, the fact that the drums must necessarily come in contact with the severed product in order to push it forward subjects the product to a further and not always desired lamination, with further ensuing risks for the product to end up sticking onto the surface of one of the drums.

Moreover, it should be remarked that the distance between two windows of the same drum, measured as it is on the side surface of the drum itself, univocally determines the sum of the length of the product after cutting and of the free gap between said product after cutting and the long tape of string advancing on the conveyor.

Consequently, a machine of this type is subjected to further constraints that limit its practical use: in fact, it is on one side necessary for the peripheral speed of the first drum to be anyway higher than the advancement speed of the tape or string on the conveyor, this in order to make it possible for the severed piece to be removed from the tape or string, whereas on the other side, when an increase in production frequency is desired, it is necessary to have a drum with a greater number of windows, thing that very remarkably increases the drum size itself, consequently its encumbrance and the overall costs of the machine.

Another similar machine is disclosed in document GB-A-2,122,131

DESCRIPTION OF THE INVENTION

The present invention aims at proposing a process for severing and subdividing into portions tapes or strings made of gummy products, particularly in the field of the food industry, that is constructively simple and makes it possible to reach very high production rates.

The above aim has been accomplished thanks to putting into practice the features described in the main independent claim.

The dependent claims outline particularly advantageous forms of embodiment of the present invention.

A further aim of the present invention is that of proposing a device for operating said process.

Said device is described in claim 6, and the claims that depend on it outline some particularly advantageous forms of embodiment of the device according to the invention.

The cutting action by carving the tape or string made of gummy material is carried out by at least one blade; according to a particularly advantageous form of embodiment of the present invention, said cutting action is simultaneously carried out on two opposite sides of the tape or string by a couple of cutting blades that are opposite to one another.

According to an important feature of the process according to the present invention, during the cutting phase said at least one blade, besides being transversally motioned in order for it to accomplish the slitting of the product, is simultaneously motioned along the same longitudinal advancement direction of the tape or string, this at a higher advancement speed of the tape or string of product.

In so doing said at least one blade pushes forward the portion that has just been cut on the conveyor, removing it from the tape or string that advances by a distance that separates the pieces that have undergone cutting, distance that is necessary for a correct functioning of the packaging machine that is located downstream from the cutting device.

Once the portion resulting from the cutting is removed from the tape that advances on the conveyor by a certain distance, said at least one blade is rapidly brought back to its cutting position in order to get a new cycle started, whilst some pushers load the piece of product after cutting over the gap and onto the conveyor of the packaging machine next to it.

According to the present invention, said at least one cutting blade follows a cyclic trajectory having an elongated shape, and this can substantially be defined as ellyptical or "bean-shaped", the long axis of said elongated shape being parallel with the plane of the conveyor on which the product to cut is motioned.

In case the process according to the invention is carried out by a cutting device that has a couple of blades one above the other and mutually aligned on both sides with respect to the product to cut, said blades are motioned along cyclical trajectories that are mutually symmetrical, each of which having a shape of the above defined type that they follow in opposite directions.

ILLUSTRATION OF DRAWINGS

Other features and advantages of the present invention will result to be more easily understandable after reading the following description, that is only given by way of a not limiting example, with reference to the figures shown in the tables hereto attached, in which:

FIG. 1 shows a schematic side view of a plant of a type which is generally defined as "cut and wrap" for the lamination, cutting and packaging of a gummy product like chewing-gum, soft toffees and alikes, provided with a cutting device with a couple of blades opposite to one another;

FIG. 2 is a schematic view from above of FIG. 1;

Figure 6:
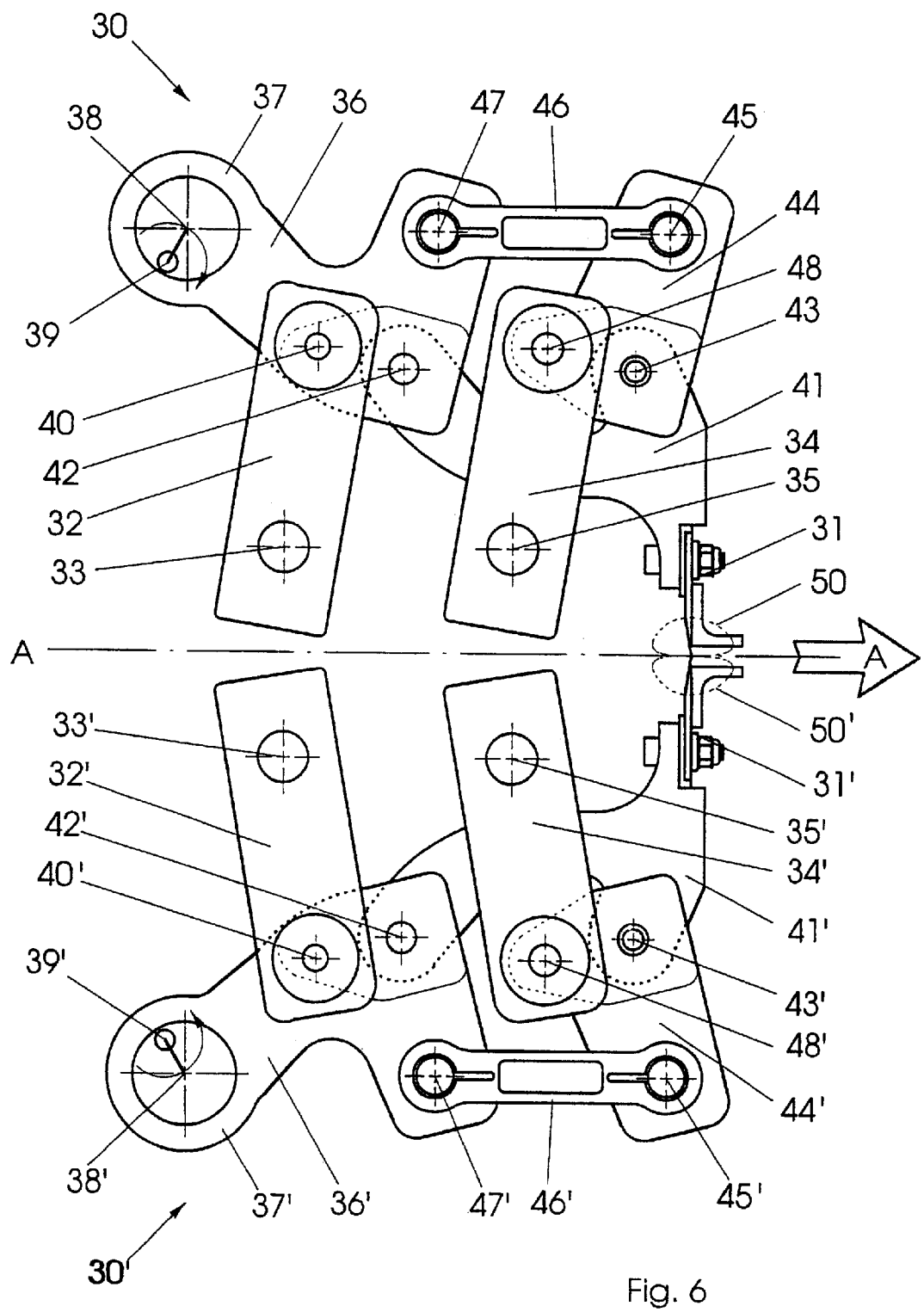

FIGS. 3, 4 and 5 schematically show the consecutive working phases of the cutting blades, respectively the beginning of the cutting phase, the end of the cutting phase and the phase of removal of the piece after cutting from the tape or string which advances;

FIG. 6 shows a schematic side view of a possible form of embodiment of the motioning mechanism having a couple of cutting blades.

DESCRIPTION OF A FORM OF EMBODIMENT OF THE INVENTION

In FIGS. 1 and 2, reference numeral 10 generally shows a plant for the working, cutting into portions and packaging of a gummy product, for example chewing-gum or soft toffees or similar products; such a plant is generally defined as a "cut and wrap" plant and comprises a first laminating station 11 were a mass of product coming from a manufacturing station is laminated between a couple of rolls 12, 13, in order to obtain a continuous tape or string 14 of product advancing along a suitable conveyor 15.

Downstream from the lamination station a second station 16 is provided that is suitable for cutting and subdividing product 14 into portions; said second station 16 is the main object of the present specification and is going to be more detailedly described below.

Immediately downstream from cutting station 16 a third station 17 is found that causes an advancement of single portions 14', 14" . . . of product, towards a conveyor 18, provided with a chain advancement mechanism 19 provided with a plurality of pushers 20 that motion the potions of product towards a fourth packaging station (not shown) for the single products.

In FIG. 6 the operating mechanism of station 16 is shown, that accomplishes the cutting of product 14 and its subdivision into portions one at a certain distance from the others, this in the particular case in which said station 16 comprises a couple of cutting groups 30, 30' opposite to each other and respectively located above and below the tape or string of advancing product, and provided with a couple of cutting blades 31, 31' opposite to one another.

The following description specifically refers to cutting group 30. It is also meant to refer to group 30', which is symmetrical to group 30 with respect to horizontal plane A–A', that is the middle plane of the tape or string of product advancing along the conveyor.

Group 30 comprises a first oscillating lever 32, which is pivoted in 33 onto the frame of group 30, as well as a second oscillating lever 34, pivoted onto the frame of group 30.

The movement of blades 31, 31' is generated starting from a connecting rod and crank system: primary lever 36 of said system has an end 37 that is connected to an eccentric pivot 38 which is itself connected to a driving shaft 39.

Consequently, primary lever 36 receives the portion of shaft 39 and moves along a circumference having its centre in 39; furthermore, such a primary lever 36 is hinged onto an articulated joint 40 of said first oscillating lever 32; therefore the rotary movement of driving shaft 39 is accountable for the repeated oscillation having a predetermined amplitude—for example in the 10°–15° range with respect to the vertical line—of lever 32 around a fixed pivot 33.

Blade 31 is rigidly constrained to an end of blade-bearing lever 41, whose other end is connected to fulcrum 42 of said primary lever 36.

Said blade-bearing lever 41 has furthermore a protrusion 43 in correspondence with which secondary lever 44 of the kinematic motion under consideration has its fulcrum.

Said secondary lever 44 is connected at one end 45 and by dint of a bar 46, with a protrusion 47 of the primary lever 36, whereas at the other end 48 it is connected to second oscillating lever 34.

The functioning of said kinematic motion is determined starting from the rotation of driving shaft 39, because of a cyclic trajectory with an elongated shape followed by blade 31 and constrained to blade-bearing lever 41, this thanks to the combination of the movements of primary lever 36, whose fulcrum is at 40, and the oscillation of lever 32 around pivot 33, whereas the other levers described above (34, 44, 46) essentially fulfill the role of closing the articulated kinematic motion.

As it was detailed previously, such a configuration is symmetrically repeated for lower group 30'.

Consequently, blade 31 is forced to move along a first trajectory 50, whereas blade 31' simultaneously moves along symmetrical trajectory 50'.

In FIGS. 3, 4 and 5 there are found to be shown in greater detail the behaviour and functions of respective blades 31, 31' along cyclical trajectories 50, 50'.

With particular reference to those figures, it can be noticed that respective blades 31, 31' are vertically aligned with one another and they are found on both sides of tape or string 14 to cut and subdivide into portions 14', 14" by a certain distance from one another.

In FIG. 3 there is found to be represented the beginning of the cutting phase with portion 14' of tape or string 14 of product which is still joined to the tape or string itself and located downstream from open blades 31 and 31', which at this point advance at the same speed as tape or string 14.

Aftewards blades 31, 31' approach each other and bore deeply into the product, until (FIG. 4) they reach a situation wherein they are touching each other, that is basically in correspondence with the middle line of the product.

On moving from the position shown in FIG. 3 to that shown in FIG. 4, blades 31 and 31' have also got a longitudinal advancement motion with a direction and intensity that equal the advancement motion kept by tape or string 14, therefore the first stretch of cyclical trajectory 50 consists of an arc 51 shown in bold lines in FIG. 4, besides the mutually opposite movement, one towards the other that is, which is necessary in order to accomplish the cutting of the product.

After that, on moving from the position held in FIG. 4 to the protrusion shown in FIG. 5, blades 31 and 31' increase the advancement speed and follow trajectory 52, shown in bold in FIG. 5; at this stage portion 14' is accelerated by the push exerted by respective blade bodies 31, 31', and is then separated by a predetermined distance X from the tape or string 14, which instead advances with a constant speed.

In such a way, at the end of the third phase shown in FIG. 5, a part of the string itself is already positioned in the cutting area.

Advantageously during this phase blades 31 and 31' reach a certain mutual distance, therefore second stretch 52 of the cyclic trajectory consists of a slightly sloping line.

The return of blades 31 and 31' to their initial position takes place in the contrary stretch of cyclic trajectory 50 running in an opposite direction, which can be differently shaped with respect to what shown in FIGS. 3, 4 and 5, and have for example a shape such as that shown in FIG. 6.

Finally, the two opposite blades can be positioned so as to be slightly tilted with respect to the vertical line, this in order to accomplish a better penetration into the gummy product, depending on the physical features of the mass of gummy product to be subdivided into portions.

Experimental trails have shown that it is possible to form an angle of up to 3° with the vertical line.

As shown above, each of blades 31 and 31' has a trajectory that comprises a stretch having the same direction as that of the advancement of the tape or string 14 to cut, and a stretch in a direction which is opposite to that of said advancement.

More specifically the stretch with the same direction consists of two distinct types of movement of the blades 31, 31'.

A first type of movement shown with reference numeral 51, is substantially shaped as an arc, along which the carving and cutting of the tape or string 14 takes place, and the two blades are brought from their outermost position to a position of mutual contact along the middle line of the string or tape itself.

The second stretch, shown with reference numeral 52, has a direction which is substantially rectilinear and advantageously. It is also slightly tilted, along which the blades 31 and 31' reach a certain mutual distance in a progressive fashion, and they furthermore increase their advancement speed in order to accomplish the separation phase of the portion that has already been cut from the rest of the tape or string.

The stretch in the direction which is opposite to the trajectory of the blades is also the return phase of the blades themselves to their initial position and because it is not influential for the positive outcome of the cutting, it can have several different shapes, from substantially rectilinear to variously shaped, depending on the length of said stretch running in the opposite direction.

The mechanism necessary for the motioning of the two blades along the cyclic trajectories described above can be conformed in different ways; however, it is preferably made of an articulated lever based structure.

The present invention was previously described with reference to one of its preferred forms of embodiment.

However, the present invention is susceptible to feature several variants within its mechanical equivalences.

By way of example, according to a further form of embodiment of the present invention (which is not shown in the figures) the cutting of the tape or string 14 occurs by dint of just one blade 30 that carves the product until the moment when the complete detachment of one portion of the tape or string itself is accomplished.

In such a case, the trajectory followed by the blade is deeper compared with that shown with reference to FIGS. 3, 4 and 5; however, the principle which the attainment of such a trajectory is based on, as well as in order to obtain an accelerated removal of portion 14' separated from tape or string 14' is the same as that described above.

It is important to remark that the process for cutting described above makes it possible to obtain a series of important advantages with respect to the processes of the state of the art.

In fact, the process according to the invention makes it possible to obtain very high cutting frequencies namely typically in the range between 1200 and 1500 pieces per minute; the values shown are to be considered as indicative, mostly in so far as the upper limit is concerned, and forms of embodiment of the invention are conceivable that make it possible to obtain cutting frequencies that are higher than those given above.

Moreover, the cutting process according to the present invention is carried out without using external means, such as for example the drums described in the italian patent application cited above, that come directly to contact the product to cut, and that give way to mechanical types of constraints which are extremely difficult to overcome.

The greater cost-effectiveness of the cutting station according to the present invention, as compared with that described in the italian patent application cited above, results to be clearly and absolutely evident to a person skilled in the art.

What is claimed is:

1. A process for the subdivision of a relatively elastic and gummy food product shaped as a continuous tape or string, which is extruded or laminated, and advancing at a predetermined speed on a conveyor into a plurality of single portions which are separated from one another by a predetermined distance, comprising cutting said tape or string by moving at least one blade for penetrating inside the mass of the tape or string and for causing the detachment of a portion of the tape or string itself, wherein said at least one blade follows a predetermined trajectory comprising a first stretch wherein cutting the tape or string is effected, a second stretch along the same advancement direction of the tape or string, a third stretch opposite to the advancement direction of the tape or string, said at least one blade running along said second stretch at a speed that is higher than the advancement speed of said tape or string, whereby along said second stretch the body of said at least one blade remains in contact with the edge of the portion of tape or string for separating the portion of tape or string by a predetermined distance, wherein said predetermined trajectory has an elongated shape, and is further cyclical and closed, with a major axis lying on a plane that is parallel to the plane where the product to cut lies.

2. The process according to claim 1, wherein the cutting is performed on a plane that is perpendicular to the plane whereon the product to cut lines.

3. The process according to claim 1, wherein the cutting is performed on a plane that is tilted with respect to a perpendicular to the plane whereon the product lies.

4. The process according to anyone of the preceding claims, wherein the cutting of the product into portions is carried out on both sides of the product itself with respect to the middle plane of said tape or string.

5. The process according to claim 1, wherein at the moment when the cutting of the product begins, the advancement speed of the tape or string and the advancement speed of said at least one blade in the same advancement direction as the tape or string are basically the same.

6. A device for the subdivision of a food product which is relatively elastic, gummy, shaped as a continuous tape or string which is extruded or laminated, and advances on a conveyor at a predetermined speed, into a plurality of single portions which are separated from one another by a predetermined distance, comprising at least one blade for penetrating inside the mass of the tape or string and for causing the detachment of one portion from the tape or string itself, comprising means for constraining said at least one blade to a kinematic mechanism that forces said at least one blade to follow a trajectory that is elongated, cyclical and closed, said trajectory comprising a first stretch wherein the tape or string is cut, a second stretch wherein said at least one blade advances in the same direction as the tape or string, and a third stretch wherein said at least one blade moves in the opposite direction with respect to the advancement of the tape or string, and in that along said second stretch the body of said at least one blade remains in contact with the edge of the portion of tape or string in order to separate said portion of tape or string by a predetermined distance.

7. The device according to claim 6, wherein said kinematic mechanism is driven by a connecting rod and crank mechanism captioned by a driving shaft.

8. The device according to claim 7, wherein the kinematic mechanism comprises a primary lever joined by one of its ends to an eccentric pivot constrained to said driving shaft and by its other end to an end of a blade-carrying lever to which the cutting blade is fixed, said primary lever having its fulcrum on a first oscillating lever which is pivoted onto a frame of said device.

9. The device according to claim 8, wherein the kinematic mechanism further comprises a secondary lever which has its fulcrum on a protrusion of said blade-carrying lever, an end of said secondary lover being joined to an articulation of a second oscillating lever which is pivoted onto the frame of said device, the other end of said secondary lever being joined to a protrusion of said primary lever by a joining bar.

10. The device according to anyone of claims 6 to 9, wherein it comprises a couple of blades which are opposite to one another and which are aligned with each other, each of which is motioned starting from a kinematic mechanism driven by a connecting rod and crank mechanism.

\* \* \* \* \*